(12) United States Patent
Watanabe et al.

(10) Patent No.: US 6,206,286 B1
(45) Date of Patent: Mar. 27, 2001

(54) BAR CODE READER

(75) Inventors: Mitsuo Watanabe; Isao Iwaguchi; Shinichi Sato; Hiroaki Kawai; Motohiko Itoh, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,582

(22) Filed: Mar. 24, 1998

(30) Foreign Application Priority Data

Aug. 8, 1997 (JP) .................................................... 9-214744

(51) Int. Cl.⁷ ............................................................ G06K 7/10
(52) U.S. Cl. ............................. 235/462.01; 235/472.01; 235/463; 235/383
(58) Field of Search ...................................... 235/437, 454, 235/462.01, 463, 472, 462.16, 462.13, 383

(56) References Cited

U.S. PATENT DOCUMENTS

| | | | |
|---|---|---|---|
| 5,189,288 | * 2/1993 | Anno et al. | 235/386 |
| 5,194,722 | * 3/1993 | Mergenthaler et al. | 235/463 |
| 5,361,871 | * 11/1994 | Gupta et al. | 186/61 |
| 5,414,252 | * 5/1995 | Shinoda et al. | 235/463 |
| 5,457,308 | * 10/1995 | Spitz et al. | 235/462.16 |
| 5,463,214 | * 10/1995 | Longacre et al. | 235/472 |
| 5,478,999 | * 12/1995 | Figarella et al. | 235/462 |
| 5,493,108 | * 2/1996 | Cherry et al. | 235/454 |
| 5,502,296 | * 3/1996 | Kawai et al. | 235/462 |
| 5,519,199 | * 5/1996 | Watanabe et al. | 235/462 |
| 5,525,784 | * 6/1996 | Kawai et al. | 235/437 |
| 5,525,785 | * 6/1996 | Kawai et al. | 235/437 |
| 5,686,715 | * 11/1997 | Wantanabe et al. | 236/436 |
| 5,689,103 | * 11/1997 | Watanabe | 235/462.13 |
| 5,724,458 | * 3/1998 | Katoh et al. | 382/312 |
| 5,756,983 | * 5/1998 | Sato et al. | 235/472 |
| 5,777,310 | * 7/1998 | Liu et al. | 235/462.16 |
| 5,780,832 | * 7/1998 | Watanabe et al. | 235/462 |
| 5,789,730 | * 8/1998 | Rockstein et al. | 235/472 |
| 5,798,510 | * 8/1998 | Watanabe et al. | 235/462 |

FOREIGN PATENT DOCUMENTS 58-221468  12/1983  (JP) .

* cited by examiner

Primary Examiner—Karl D. Frech
Assistant Examiner—Daniel Felten
(74) Attorney, Agent, or Firm—Armstrong, Westerman, Hattori, McLeland & Naughton, LLP

(57) ABSTRACT

A double-reading preventive control processing unit, when demodulated data corresponding to a whole bar code is obtained in an M10-OK buffer, notifies a reading-OK processing unit of this demodulated data on condition that a double-reading preventive timer is not actuated, stores a single-reading multi-stage buffer with this demodulated data, and actuates the double-reading preventive timer. The single-reading multi-stage buffer is capable of storing plural demodulated data in sequence from the latest one, of which the reading-OK processing unit has been notified. When demodulated data is newly obtained before the double-reading preventive timer makes a time-up, the double-reading preventive control unit checks whether or not the new demodulated data is identical with the demodulated data stored in the single-reading multi-stage buffer. When identical, this new piece of demodulated data is discarded. Whereas when not identical, the reading-OK processing unit is notified of this new demodulated data, and the single-reading multi-stage buffer is stored with the same data. The double-reading preventive timer is then re-started.

9 Claims, 8 Drawing Sheets

| 1 | D |
|---|---|
| 2 | C |
| 3 | B |
| 4 | A |
| EE | |

FIG. 14

BAR CODE READER

BACKGROUND OF THE INVENTION

1. Field of the Invention

The present invention relates to a bar code reader, more particularly, to a bar code reader capable of properly preventing a bar code from being read double.

2. Description of the Related Art

In recent years, it has been generalized that commercial goods are managed by bar codes as typified by a POS system in the sector of distribution industries etc. For example, in the POS system in a shop, pieces of information on classifications and sales prices etc of the goods are coded in a format of the bar code and printed on the goods. The bar code is read at the check-out counter, and a payment is made based on the read information. Then, the number of sold goods is counted in real time, and a result of count serves an inventory management and a stocking management.

Incidentally, the bar code reader is roughly classified into a fixed type bar code reader integrally incorporated into a register device, and a handy type bar code reader operable while being held by a hand and connected via a communication cable to the register device.

Figure 14:
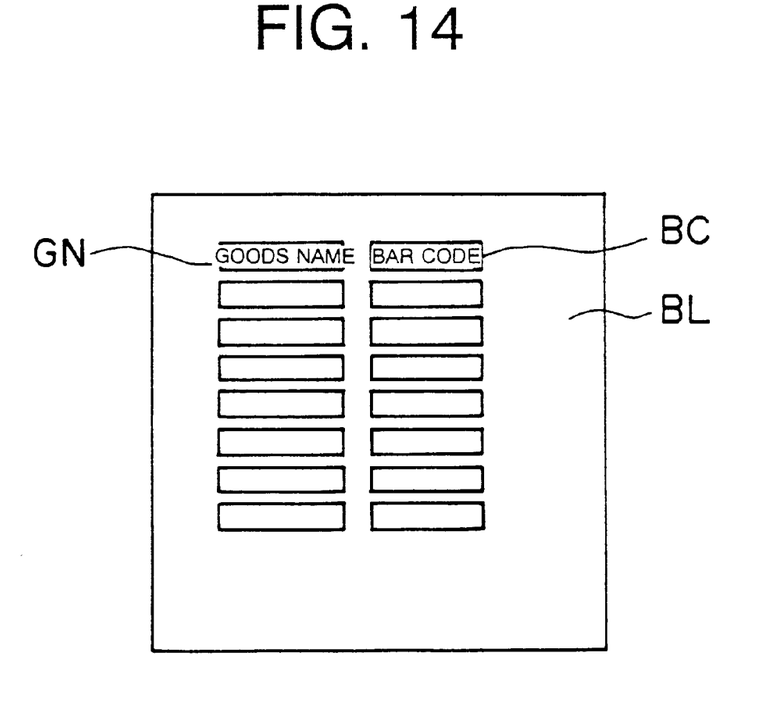
FIG. 14 is a plan view showing a bar code list.

On the other hand, the bar code is printed on a label stuck to a commercial goods or a container of the commercial goods in a case where it is difficult to print the bar code on the commercial goods itself (e.g., perishable foods) (i.e., in-store marking), and is printed on a bar code list BL as shown in FIG. 14 in a case where it is difficult to stick the label thereto (e.g., fast-food and foods sold by weights). This bar code list BL is a sheet on which goods names GN of a multiplicity of goods and corresponding bar codes BC are printed, and prepared in the vicinity of the register device (e.g., on the upper surface of the register device). Then, a casher at the register, when selling the goods with the bar code list BL on which the goods name GN is written, reads the bar code BC corresponding to the goods name GN from this bar code list BL by use of the handy type bar code reader.

The conventional handy type bar code reader, especially, the bar code reader of such a type as to manipulate a laser beam, is not designed in consideration of reading the bar code printed on the above bar code list BL. Accordingly, in the case of reading the bar code printed on the bar code list BL by using the conventional handy type bar code reader, it is impossible to obviate a problem of double-reading which will hereinafter be explained.

To be specific, the conventional handy type bar code reader has hitherto been also mounted with a double-reading preventive mechanism for preventing the double-reading when reading the bar code stuck to the external surface of normal goods. This double-reading preventive mechanism includes a buffer for storing only one piece of demodulated data corresponding to the whole bar code, and a double-reading preventive timer for measuring an elapse time since the demodulated data has been once obtained. Then, this double-reading preventive mechanism, upon obtaining the demodulated data once by reading the bar code, writes this piece of demodulated data to the buffer and starts the double-reading preventive timer. Subsequently, this double-reading preventive mechanism, when the same demodulated data is obtained once again till the double-reading preventive timer makes a time-up after a predetermined time has elapsed, conceives that the same bar code is read twice, and invalidates the demodulated data obtained second time onwards.

On the other hand, when the bar codes BC written on the bar code list BL are read sequentially from above by use of the handy type bar code reader, it might happen that a scan beam accidentally scans the bar code read last time and the bar code read previous time before last on the occasion of raising the handy type bar code reader away from the bar code list BC. In such a case, the double-reading preventive mechanism incorporated into the conventional handy type bar code reader prevents the double-reading of only the bar code read last time (i.e., the buffer is stored with only the demodulated data corresponding to the bar code read last time), and consequently the demodulated data obtained by scanning the bar code once again by accident, which has been read previous time before last or read more previously than that time, might be treated as being valid.

SUMMARY OF THE INVENTION

It is a primary object of the present invention to provide a bar code reader capable of properly preventing a bar code even in such a case that the bar code is read on a sheet on which a plurality of codes are printed.

According to a first aspect of the present invention, a bar code reader comprises a detecting unit detecting a bar code pattern of a bar code based on reflected beams from the bar code, a demodulating unit executing a demodulating process based on the bar code pattern detected by said detecting unit to obtain data coded into the bar code as demodulated data, a storage written with demodulated data and storing a predetermined plurality of recently written demodulated data, a timer measuring an elapsed time after actuating thereof and stopping when the elapse time reaches a predetermined time, a demodulated data validating unit for validating the demodulated data obtained by said demodulating unit on condition that the demodulated data is not identical with any piece of demodulated data stored in said storage if said timer is measuring the elapse time at a point when the demodulated data is obtained by said demodulating unit, and immediately validating the demodulated data obtained by said demodulating unit if said timer is not measuring the time at a point when the demodulated data is obtained by said demodulating unit, a demodulated data writing unit, when said demodulated data validating unit validates the demodulated data, for writing the demodulated data into said storage, and a timer actuating unit for actuating said timer when said demodulated data validating unit validates the demodulated data.

With this construction, the detecting unit detects the bar code pattern of this bar code on the basis of the reflected light beams from the bar code. The demodulating unit executes the demodulating process on the basis of the bar code pattern detected by the detecting unit, and acquires the data coded into the bar code as demodulated data.

When the demodulating unit obtains the demodulated data corresponding to all of the bar code, the demodulated data validating unit checks whether or not the timer is measuring the elapse time. Then, if the timer is neither actuated nor yet measuring the elapse time, the demodulated data validating unit validates this piece of demodulated data. At this time, the demodulated writing unit writes the same demodulated data to the storage, and the timer actuating unit actuates the timer. By contrast, if the time is measuring the elapse time, the demodulated data validating unit compares the demodulated data obtained by the demodulating mechanism with all the demodulated data stored in the storage unit. Then, if the demodulated data obtained by the demodulating unit is identical with any one piece of demodulated data stored in the storage, the demodulated data validating unit discards of the demodulated data obtained by the demodulating unit. Whereas if the demodulated data obtained by the demodulating unit is different from any pieces of demodulated data stored in the storage, the demodulated data validating unit validates the demodulated data obtained by the demodulating unit. At this time, the demodulated data writing unit writes this piece of demodulated data to the storage, and the timer actuating unit re-actuates the timer.

Thus, the demodulated data is compared with plural pieces of demodulated data recently written in the storage, and is validated only when not coincident with these pieces of demodulated data. Therefore, even in such a case that the bar codes are consecutively read on the bar code list on which the plurality of bar codes are printed, the double-reading contrary to the intention is prevented.

The detecting unit may be constructed such that the same unit scans the bar code by use of the light beam, receives the reflected light beam reflected from the bar code, and detects a variation in luminance thereof or detect a luminance distribution by imaging the bar code with a line sensor or an area sensor.

The demodulating unit may be constructed to acquire the demodulated data corresponding to the whole bar code by demodulating only the bar code pattern corresponding to the whole bar code, or demodulate the bar code pattern corresponding to only a part of the bar code and acquire the demodulated data corresponding to all of the bar code by synthesizing fragments of demodulated data obtained by the demodulating unit.

The storage may be constructed as a multi-stage buffer so as to store plural pieces of demodulated data in sequence from the latest data in terms of time of its being written. In this case, if a new piece of demodulated data is written to the storage unit in a state where the storage unit is stored wit the demodulated data to its storable limit, the oldest demodulated data may be discarded. If the storage has already been stored with the same demodulated data as the newly written demodulated data, however, the same demodulated data as the newly written demodulated data may be disposed of from the storage.

A single unit of timer may be prepared in common to all the demodulated data stored in the storage unit, or prepared for each piece of demodulated data stored in the storage unit. It is desirable that this timer be so constructed as to re-measure the elapse time on the basis of a restart time.

In the bar code reader according to a second aspect of the present invention, the storage stores only one piece of data with respect to identical demodulated data.

In the bar code reader according to a third aspect of the present invention, a number of the timer is only one, and wherein the timer re-measures the elapsed time from a start every time actuated by the timer actuating unit.

The bar code reader according to a fourth aspect of the present invention further comprises a first scan mechanism for irradiating the bar code with a light beam to scan the bar code in only one direction; a second scan mechanism for irradiating the bar code with light beams to scan the bar code in a plurality of directions; and a judging unit for judging whether the demodulated data demodulated by said demodulating unit is first demodulated data based on a reflected light beam of the light beam irradiated by said first scan mechanism or second demodulated data based on reflected light beams of the light beams irradiated by said second scan mechanism. Further, the storage stores only the first demodulated data, the demodulated data validating unit validates the first demodulated data obtained by said demodulating unit on condition that the first demodulated data is not identical with any piece of demodulated data stored in said storage if said timer is measuring the elapsed time at a point when the first demodulated data is obtained by said demodulating unit, and immediately validates the first demodulated data obtained by said demodulating unit if said timer is not measuring the elapsed time at a point when the first demodulated data is obtained by said demodulating mechanism, and the demodulated data writing unit writes the first demodulated data into said storage unit when said demodulated data validating unit validates the first demodulated data. With this construction, even in such a case that the single-reading mode by the first scan mechanism and the multi-reading mode by the second scan mechanism are switched over, the double-reading contrary to the intention on the occasion of the single-reading mode is prevented.

The bar code reader according to a fifth aspect of the present invention further comprises a second storage storing only one piece of the second demodulated data. The demodulated data validating unit validates the second demodulated data obtained by the demodulating unit on condition that the second demodulated data is not identical with the demodulated data stored in the second storage if said timer is measuring the elapsed time at a point when the second demodulated data is obtained by said demodulating unit, and immediately validates the second demodulated data obtained by the demodulating unit if the timer is not measuring the elapsed time at a point when the second demodulated data is obtained by said demodulating mechanism, and the demodulated data writing unit writes the second demodulated data into said second storage when the demodulated data validating unit validates the second demodulated data. If thus constructed, the double-reading on the occasion of the multi-reading mode can be prevented.

BRIEF DESCRIPTION OF THE DRAWINGS

The invention will be described below in detail with reference to the accompanying drawings, in which.

DESCRIPTION OF THE PREFERRED EMBODIMENT

One embodiment of the present invention will hereinafter be described with reference to the accompanying drawings.

(External Configuration of Bar Code Reader)

Figure 1:
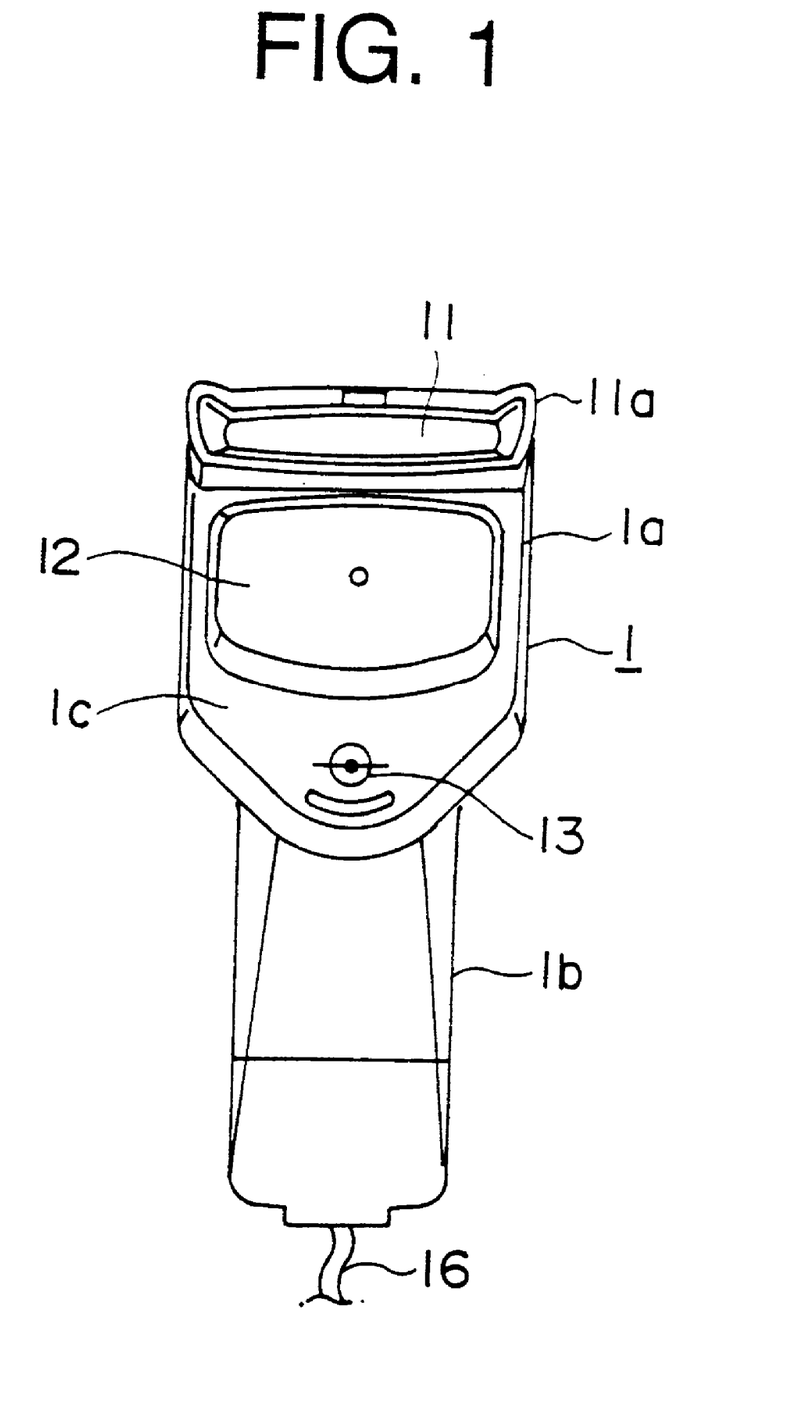
FIG. 1 is a bottom view of a bar code reader in one embodiment of the present invention.
Figure 2:
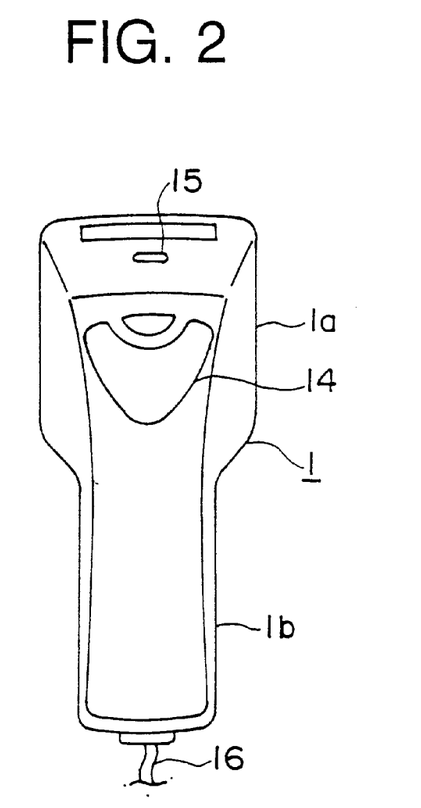
FIG. 2 is a top view of the bar code reader shown in FIG. 1.
Figure 3:
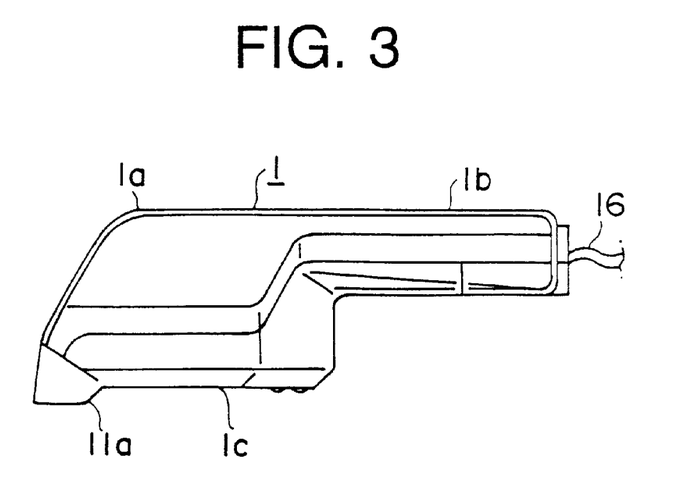
FIG. 3 is a side view of the bar code reader shown in FIG. 1.

FIG. 1 is a bottom view illustrating a handy type bar coder reader 1 of an embodiment according to the present invention. FIG. 2 is a top view thereof. FIG. 3 is a side view thereof. As illustrated in FIGS. 1 through 3, the bar code reader 1 consists of a grip member 1b having a small width, and a reading member 1a having a large width and formed in continuation from a front end (an upper side in FIG. 1) of the grip member 1b.

A bottom surface 1c of this reading member 1a is, as illustrated in FIG. 1, a flat surface taking a substantially home-plate shape with its vertex directed toward the grip member 1b, and, as illustrated in FIG. 3, largely protrudes downward from the bottom surface of the grip member 1b. Then, a front edge of this bottom surface 1c (upper edge in FIG. 1) is formed with a signal scan beam window 11 from which a scan beam is emitted for a scan in only right-and/left directions in FIG. 1. An outer periphery of the single scan beam window 11 is fitted with a light-shielding rib 11a for preventing a beam incidence upon the single scan beam window 11 from lateral directions of the single scan beam window 11. Further, a multi-scan beam window 12 from which the scan beams is emitted for scans in a variety of directions is provided at the center of the bottom surface 1c. Moreover, a small-sized speaker 13 is incorporated in the vicinity of a proximal edge of the bottom surface 1c (a lower edge in FIG. 1).

On the other hand, a central portion on the upper surface of the reading member 1a is provided with a switch 14 pushed for switching over a bar code reading mode (hereinafter called "single reading mode") using a scan beam emitted from the single scan beam window 11 (which is hereinafter termed a "single scan beam"), and a bar code reading mode (hereinafter called "multi-reading mode") using scan beams emitted from the multi-scan beam windows 12 (which is hereinafter termed a "multi-reading mode"). Further, an LED 15 lit up when the reading of the bar code is completed, is provided in the vicinity of the front end on the upper surface of the reading member 1a.

Connected, moreover, to the proximal end of the grip member 1b is a cable 16 for transmitting to an unillustrated host device (a register device) demodulated data generated by the bar code reader reading the bar code.

(Internal Configuration)

Figure 4:
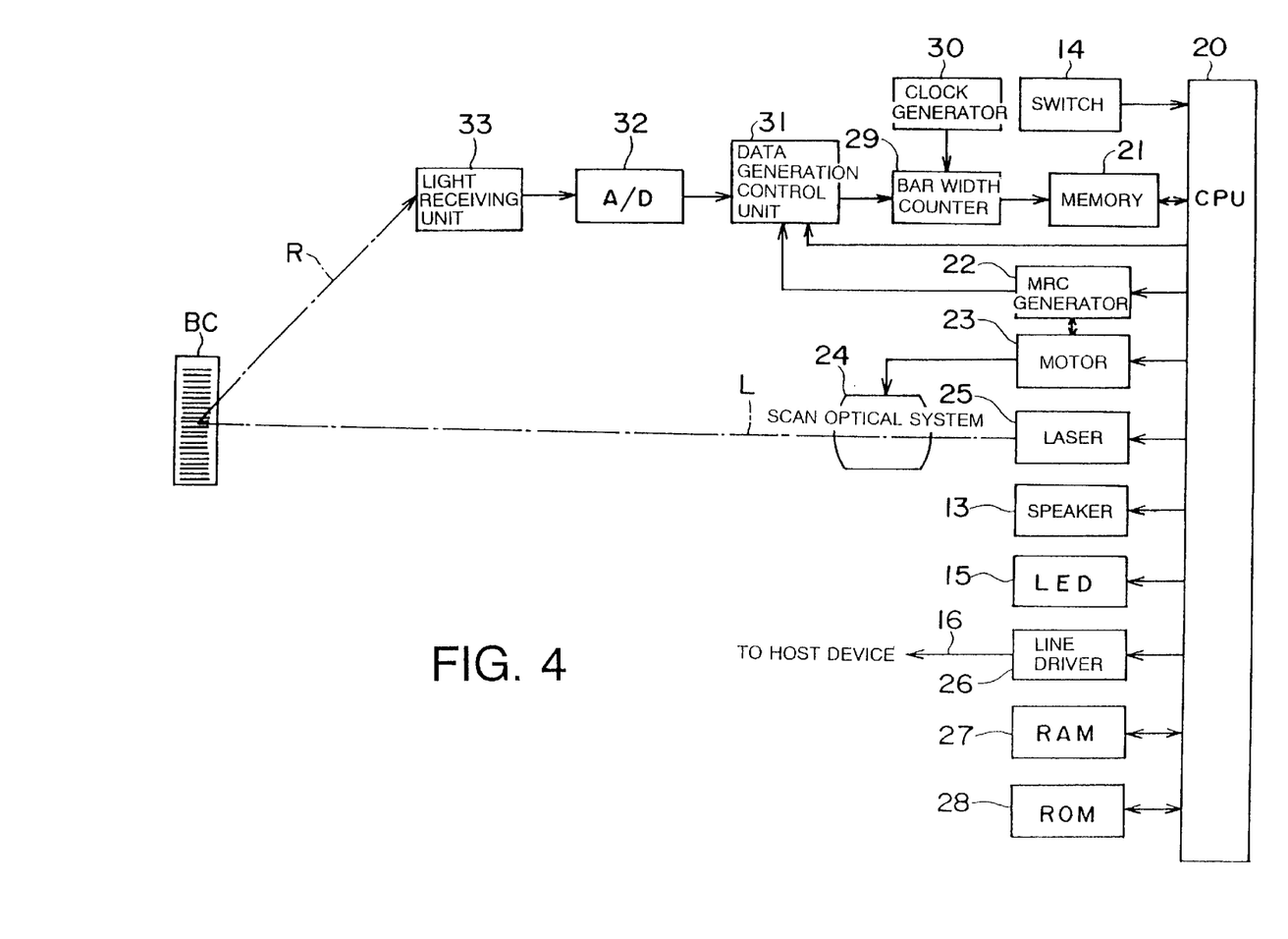
FIG. 4 is a block diagram illustrating an internal structure of the bar code reader in one embodiment of the present invention.

Next, an internal configuration of the bar code reader 1 will be explained with reference to a block diagram of FIG. 4. Connected to a CPU 20 for controlling the whole bar code reader 1 in FIG. 4 are, in addition to the above-mentioned speaker 13, the switch 14 and the LED 15, a memory 21, an MRC generator 22, a motor 23, a semiconductor laser 25, a line driver 26, a RAM 27 and a ROM 28, respectively. Further, a bar width counter 29 is connected t the memory 21. A clock generator 30 and a data generation control unit 31 are respectively connected to this bar width counter 29. An A/D converter 32 is connected to this data generation control unit 31, and a light receiving unit 33 is connected to the A/D converter 32.

The motor 23 rotates an unillustrated polygon mirror in a scan optical system 24. Supposing that "n" is the number of reflecting surfaces (not shown) formed on an outer peripheral surface of the polygon mirror, the motor 23 rotates the polygon mirror by 1/n.

The semiconductor laser 25 emits a laser beam L so that the laser beam L is incident on the scan optical system 24. The scan optical system 24 deflects the laser beams L emitted from the semiconductor laser 25, into one direction by the respective reflecting surfaces formed on the outer peripheral surface of the polygon mirror. A plurality of fixed mirrors (unillustrated) are fixed to a portion toward which the laser beams L reflected by the respective reflecting surfaces of the polygon mirror are deflected. Then, the laser beams L reflected by the reflecting surfaces of the polygon mirror are sequentially incident upon the respective fixed mirrors in accordance with rotations of the polygon mirror, and again reflected by the fixed mirrors. Then, deflecting directions (scan directions) of the laser beams L are changed in a variety of directions. According to this scan optical system 14, the laser beam scans in the plurality of directions are consecutively carried out at a high speed within a period (which is the same as a period for which a driving shaft of the motor 23 makes one rotation) of the deflection by each reflecting surface of the polygon mirror.

Among the laser beam scans in the plurality of directions, the laser beam scan in one specified direction is done through the signal scan beam window 11. Namely, the laser beam L scanning in this one specified direction is defined as the signal scan beam emitted form the signal scan beam window 11, and a construction from the semiconductor laser 25 for emitting the single scan beam to the single scan beam window 11 corresponds to a first scan mechanism.

Further, the laser beam scans in the directions excluding the above one specified direction are implemented through the multi-scan beam window 12. That is, the laser beams L scanning in the directions other than the one specified direction are defined as the multi-scan beams emitted from the multi-scan beam window 12, and a construction from the semiconductor laser 25 for emitting the multi-scan beams to the multi-scan beam window 12 corresponds to a second scan mechanism.

Figure 7:
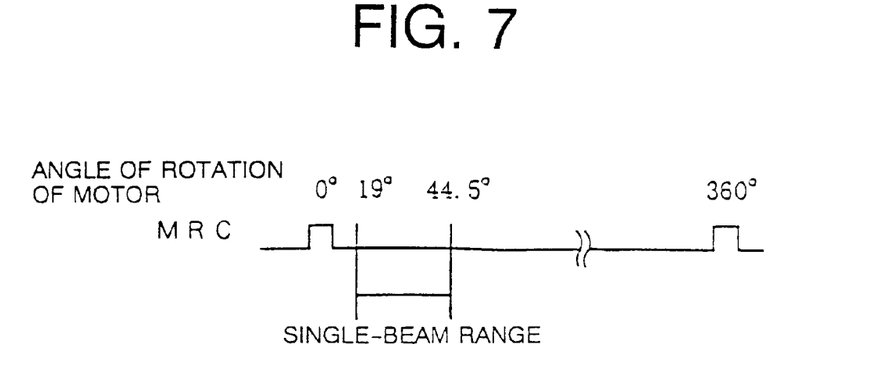
FIG. 7 is a graph showing a relationship between an angle of rotation of a motor and a single beam.

The MRC generator 22 generates a motor rotation clock (MRC) every time the driving shaft of the motor 23 makes one rotation, and inputs the clock (MRC) to the data generation control unit 31. A generation timing of this clock (MRC) is coincident with a timing at which an edge of each reflecting surface of the polygon mirror passes through a beam axis of the laser beam L emitted from the semiconductor laser 25 (i.e., a timing when the deflection of the laser beam by the individual reflecting surface is started). FIG. 7 shows a relationship between the generation timing of the clock (MRC) and the laser beam scan. As shown in FIG. 7, when an angle of rotation of the driving shaft of the motor 23 from a rotational position where the motor rotation clock (MRC) is generated (i.e., where the laser beam L starts being incident upon each reflecting surface), comes to 19°, the signal scan beam begins to be emitted. When the angle of rotation reaches 44.5°, the single scan beam is switched over to the multi-scan beams.

The light receiving unit 33 is constructed of two light receiving elements (photo diodes) respectively built in the single scan beam window 11 and in the multi-scan beam window 12. Then, the light receiving element built in the single scan beam window 11 receives a part of the reflected beams produced when the single scan beam strikes on the bar codes BC. The light receiving element built in the multi-scan beam window 12 receives a part of the reflected beams produced when the multi-scan beams strike on the bar codes BC. The respective light receiving elements input to the A/D converter 32 electric currents corresponding to brightness and darkness of the reflected beams received through the windows 11, 12. Note that the light receiving unit 33 may be constructed of a single light receiving element capable of receiving the reflected beams that have been received through the two windows 11, 12.

The A/D converter 32 converts the electric currents inputted from the light receiving elements of the light receiving unit 33, into voltage values, and compares the thus converted voltage values with a predetermined threshold value. The A/D converter 32 then executes a waveform shaping process thereof into rectangular waveform signals. This rectangular waveform signal indicates "H" when an intensity of the reflected beam corresponds to a reflectivity of a white bar in the bar code BC, and indicates "L" when the intensity of the reflected beam corresponds to a reflectivity of a black bar in the bar code BC. The A/D converter 32 detects each of a rising edge (a white edge) and a falling edge (a black edge) of the rectangular waveform. The A/D converter 32 outputs a white edge pulse (WEG) synchronizing with the black edge, and outputs a black edge pulse (BEG) synchronizing with the black edge.

The data generation control unit 31 transmits the white edge pulse (WEG) and the black edge pulse (BEG) outputted from the A/D converter 32 to the bar width counter 29 selectively in accordance with an indication given from the CPU 20. That is, when in a steady state, a rotating speed of the driving shaft of the motor 23 becomes constant, and hence the data generation control unit 31 measures a time since the motor rotation clock (MRC) inputted from the (MRC) generator 22 is received, whereby the data generation control unit 31 is capable of detecting an angle of rotation of the driving shaft of the motor 23, i.e., a rotational position of the unillustrated polygon mirror. Based on this rotational position, the data generation control unit 31 is capable of distinguishing between the single scan beam and the multi-scan beams with respect to the laser beam that is being emitted. Then, the data generation control unit 31 transmits the white edge pulse (WEG) and the black edge pulse (BEG) during only a period of the single scan beam being emitted when the single reading mode is indicated by the CPU 20. The data generation control unit 31 transmits the white edge pulse (WEG) and the black edge pulse (BEG) during only a period of the multi-scan beams being emitted when the multi-reading mode is indicated by the CPU 20.

Figure 8:
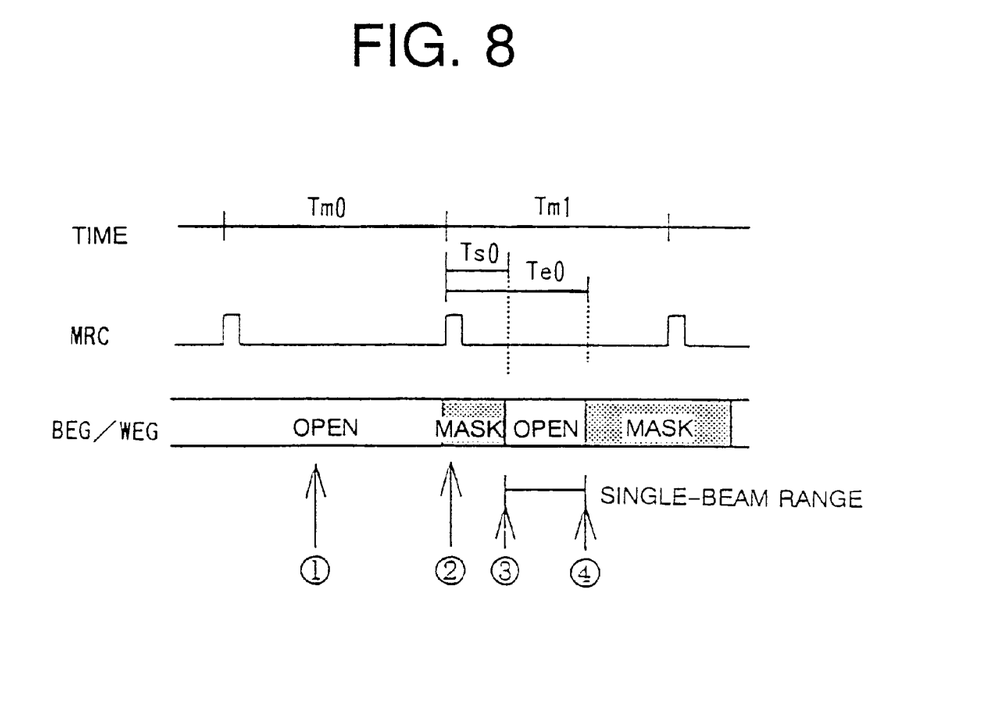
FIG. 8 is a graph showing a function of a data generation control unit shown in FIG. 4.

FIG. 8 shows an operation of the data generation control unit 31 when the indication from the CPU 20 is changed from the multi-reading mode to the single reading mode at a timing (1). In this case, the multi-reading mode continues from the timing (1) to a timing (2) when receiving the next clock (MRC), and therefore the data generation control unit 31 transmits the white edge pulse (WEG) and the black edge pulse (BEG). The single scan beam is not emitted during a period after the timing (2) up to an elapse of a time Ts0, and hence the data generation control unit 31 hinders the transmissions of the white edge pulse (WEG) and the black edge pulse (BEG). The single scan beam is emitted during a period between a timing (3) with an elapse of the time Ts0 from the receipt of the motor rotation clock (MRC) and a timing (4) after a time Te0 has elapsed, and therefore the data generation control unit 31 transmits the white edge pulse (WEG) and the black edge pulse (BEG). The multi-scan beams are emitted during a period after a timing (4) till the time Ts0 elapses since the motor rotation clock (MRC) has been received, and hence the data generation control unit 31 hinders the transmissions of the white edge pulse (WEG) and the black edge pulse (BEG).

The bar width counter 29 measures respectively a time from a timing of the white edge pulse (WEG) to a timing of the black edge pulse (BEG) (which is expected to be corresponding to a width of the white bar in the bar code BC), and a time from the timing of the black edge pulse (BEG) to the timing of the white edge pulse (WEG) (which is expected to be corresponding to a width of the black bar in the bar code BC) on the basis of the white edge pulse (WEG) and the black edge pulse (BEG) trough the data generation control unit 31. Note that the bar width counter 29 counts up the number of clocks transmitted from the clock generator 30 in order to measure the time corresponding to each of these bar width, and outputs count values corresponding to these bar widths. The data outputted from the bar width counter 16 takes such a form that this count value is combined with a color identifying signal showing white or black. Such pieces of data are consecutively outputted every time the scan in each direction is done by the laser beam L. A set of data consecutively outputted while being scanned in each direction by the laser beam L, is defined as bright/dark data corresponding to a bright/dark pattern of the bar coder BC, and hereinafter called a "bar width data set".

The light receiving unit 33, the A/D converter 32, the data generation control unit 31, the bar width counter 29 and the clock generator 30, which have been explained so far, correspond to a bright/dark data detecting mechanism.

The bar width data set outputted from the bar width counter 29 is temporarily stored in the memory 21. This memory 21 is sequentially stored with the bar width data sets inputted from the bar width counter 29, and, in response to a request from the CPU 20, transfers these bar width data sets one by one to the CPU 20.

The line driver 26 transmits the demodulated data obtained by demodulating the bar width data set, to an unillustrated host device (a register device) via the cable 16.

The ROM 28 is a read-only memory stored with a bar code recognition/demodulation processing program.

The CPU 20 executes the bar code recognition/demodulation processing program stored in the ROM 28, thereby controlling the bar code reader as a whole. The CPU 20 also functions as a demodulating mechanism, a timer, a demodulation data validating unit, a demodulated data writing unit, a timer actuating unit and a judging unit, and demodulates the bar width data set obtained by reading the bar code BC. The CPU 20, when implementing such control, develops an operation area within the RAM 27 serving as a main storage device.

Figure 5:
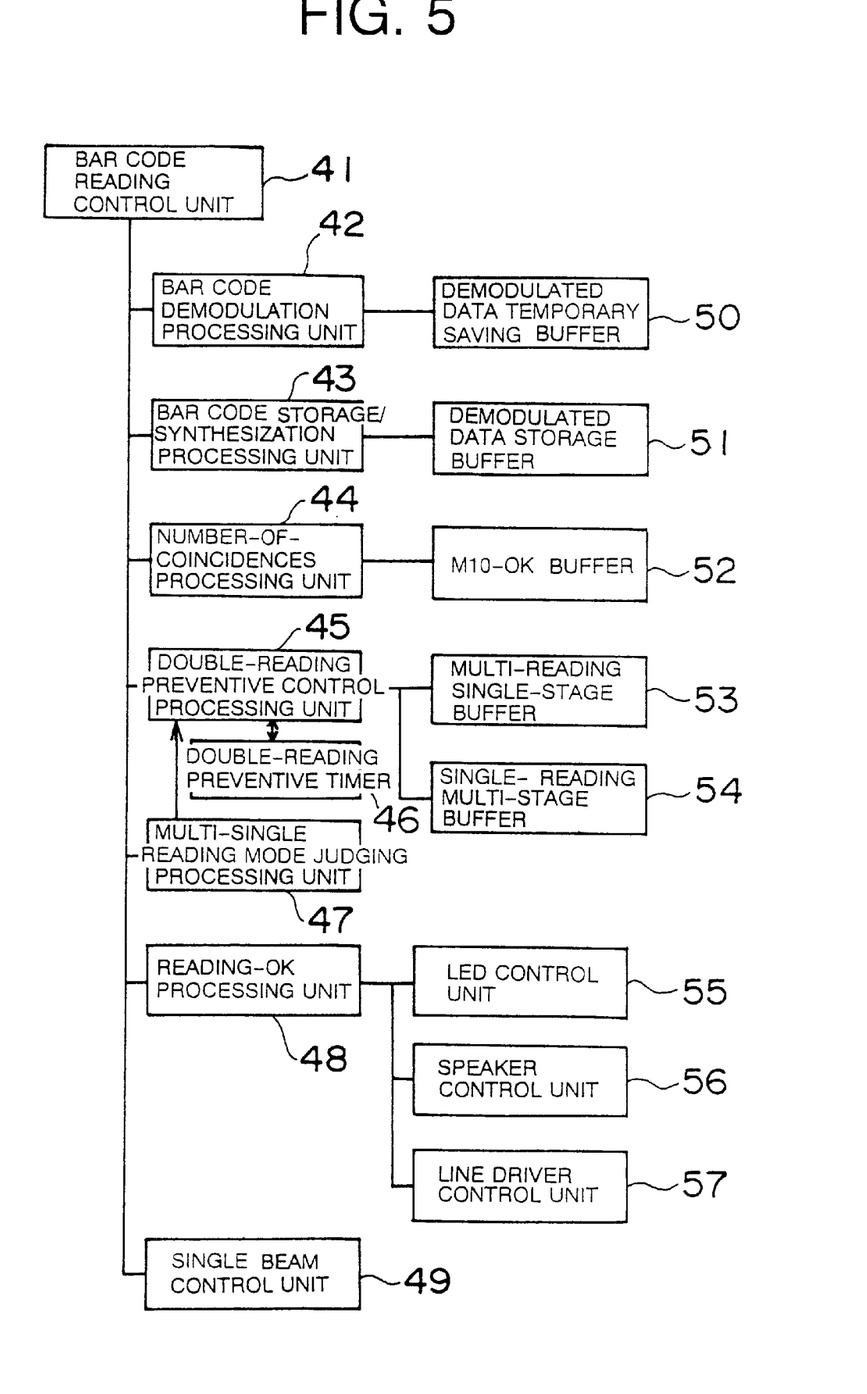
FIG. 5 is a function block diagram showing respective functions implemented in a CPU in FIG. 4 and respective buffers developed in a RAM.

FIG. 5 is a function block diagram showing the respective functions performed by the CPU 20 executing the bar code recognition/demodulation processing program in the ROM 28, and a mutual relationship between respective buffers developed in the RAM 27. As shown in FIG. 5, the CPU 20 executes the bar code recognition/demodulation processing program, whereby functions of a bar code reading control unit 41, a bar code storage synthesization processing unit 42, a number-of-coincidences processing unit 44, a double-reading preventive control processing unit 45, a double-reading preventive timer 46, a multi/single reading mode judging unit 47, a reading-OK processing unit 48, a single beam control unit 49, an LED control unit 55, a speaker control unit 56 and a line driver control unit 57, are produced in the CPU 20. Further, similarly, a demodulated data temporary saving buffer 50, a demodulated data storage buffer 51, an M10-OK buffer 52, a multi-reading single-stage buffer (buff-M) 53 and a single-reading multi-stage buffer (buff-S) 54, are developed in the RAM 27.

The bar code reading control unit 41 transfers and receives the data between the respective circuits connected to a CPU 1 and gives commands, as well as controlling other functions in the CPU 1.

The bar code demodulation processing unit 42 converts the bar width data set fetched by the bar code reading control unit 41 from the memory 21, into demodulated data corresponding to a part or the whole of the bar code in accordance with a predetermined algorithm. The demodulated data demodulated by this bar code demodulation processing unit 42 is temporarily saved in the demodulated data temporary saving buffer 50.

The bar code storage synthesization processing unit 43 sets the demodulated data saved within the demodulated data temporary saving buffer 50 into a format of the bar code that is defined in the demodulated data storage buffer 51, thereby reproducing the demodulated data corresponding to the whole bar code. At this time, when the demodulated data saved in the demodulated data temporary saving buffer 50 originally corresponds to the whole bar code, the demodulated data corresponding to the whole bar code can be reproduced simply by copying this single piece of demodulated data into the demodulated data storage buffer 51. On the other hand, when the demodulated data saved in the demodulated data temporary saving buffer 50 corresponds to only a part of the bar code, the bar code storage synthesization processing unit 43 writes plural pieces of such demodulated data into the demodulated data storage buffer 51, thereby synthesizing the demodulated data corresponding to the whole bar code.

The number-of-coincidences processing unit 44 executes a modulus 10 check with respect to the demodulated data in the demodulated data storage buffer 51.

This modulus 10 check is a process of judging whether or not the demodulated data in the demodulated data storage buffer 51 satisfies a condition imposed on the numerical data to be bar-coded. Accordingly, when passing this modulus 10 check (OK), it is conceived that the demodulated data corresponding to the whole bar code is obtained. In this modulus 10 check, the number-of-coincidences processing unit 44 classifies all data characters contained in the demodulated data into odd-numbered positions and even-numbered positions, wherein the rightmost side in the demodulated data stored in the demodulated data storage buffer 51 is defined as an odd-numbered position. Then, The number-of-coincidences processing unit 44 calculates a sum of a triple of a total sum of values of the data characters in the odd-numbered positions and of a total sum of values of the data characters in the even-numbered positions. The number-of-coincidences processing unit 44, when the calculated value is a multiple of 10, judges that there is a success in the modulus 10 check (OK), and preforms a number-of-coincidences check.

This number-of-coincidences check is a process of confirming whether or not the demodulated data passing (OK) the modulus 10 check is obtained a plurality of times. In this number-of-coincidences check, the number-of-coincidences processing unit 41 compares the demodulated data passing the modulus 10 check this time with the demodulated data (having passed the modulus 10 check last time) stored in the M10-OK buffer 52, thereby checking whether or not these two pieces of demodulated data are identical with each other. Then, when the two pieces of demodulated data are different from each other, or when the M10-OK buffer 52 is not stored with the demodulated data, the number-of-coincidences processing unit 41 stores (overwriting) the M10-OK buffer 52 with the demodulated data passing the modulus 10 check this time, and resets an unillustrated number-of-coincidences counter. Whereas the two pieces of demodulated data are identical with each other, the number-of-coincidences processing unit 44 makes the unillustrated number-of-coincidences counter count up. Then, when a count value of the number-of-coincidences counter reaches a predetermined value, the number-of-coincidences processing unit 44 judges that the number of coincidences comes to a predetermined number of times.

The bar code reading control unit 41, the demodulated data temporary saving buffer 50, the bar code storage synthesization processing unit 42, the demodulated data storage buffer 51, the number-of-coincidences processing unit 44 and the M10-OK buffer 52, which have explained, correspond to a demodulating mechanism.

The single beam control unit 49, when detecting that the switch 14 is depressed, indicates the single reading mode to the data generation control unit 31 and, when detecting that the switch 14 is not depressed, indicates the multi-reading mode thereto.

The multi/single reading mode judging processing unit 47 corresponds to a judging unit judges whether the demodulated data written to the M10-OK buffer 52 is data (first demodulated data) obtained by the single reading mode or data (second demodulated data) obtained by the multi-reading mode on the basis of the indication given to the data generation control unit 31 by the single beam control unit 49, and notifies the double-reading preventive control unit 45 of a result thereof.

Figure 9:
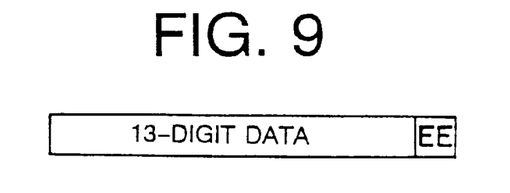
FIG. 9 is a diagram showing a structure of a multi-reading single-stage buffer shown in FIG. 5.
Figure 10:
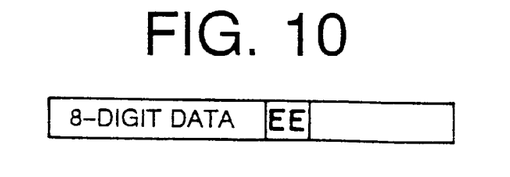
FIG. 10 is a diagram showing a structure of a multi-reading single-stage buffer shown in FIG. 5.

The multi-reading single-stage buffer 53, as shown in FIGS. 9 and 10, serves as a second storage unit for storing only one piece of demodulated data. Incidentally, FIG. 9 shows a state in which the multi-reading single-stage buffer 53 is stored with 13-digit demodulated data in such a case that the bar code to be read contain 13-digit data characters (e.g., EAN-13 and UPC). Similarly, FIG. 10 shows a state in which the multi-reading single-stage buffer 53 is stored with 8-digit demodulated data in such a case that the bar code to be read contain 8-digit data characters (e.g., EAN-8). The symbol "EE" in FIGS. 9 and 10 represents data (a stack value) indicating a tail of each piece of demodulated data.

Figure 11:
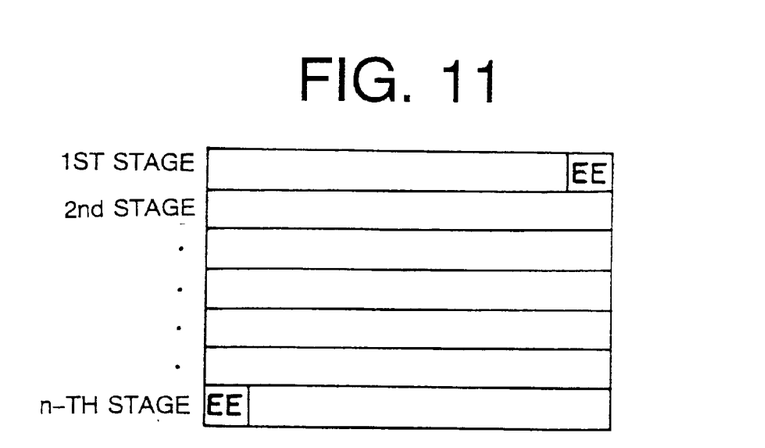
FIG. 11 is a diagram showing a structure of a single-reading multi-stage buffer shown in FIG. 5.
Figure 12:
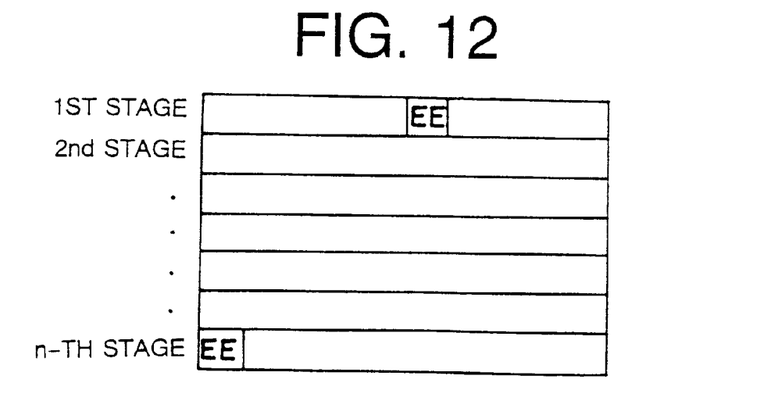
FIG. 12 is a diagram showing a structure of a single-reading multi-stage buffer shown in FIG. 5.

The single-reading multi-stage buffer 54, as shown in FIGS. 11 and 12, serves as a storage unit capable of storing (n−1) pieces of demodulated data. Incidentally, FIG. 11 shows a state in which the multi-reading single-stage buffer 53 is stored with 13-digit demodulated data in such a case that the bar code to be read contain the 13-digit data characters (e.g., EAN-13 and UPC etc). Similarly, FIG. 12 shows a state in which the multi-reading single-stage buffer 53 is stored with 8-digit demodulated data in such a case that the bar code to be read contain the 8-digit data characters (e.g., EAN-8 etc). The symbol "EE" at an entry of a (1 trough n−1)th stage in FIGS. 11 and 12 represents data (a stack value) indicating a tail of the demodulated data stored in each entry. The symbol "EE" in an entry of an n-th stage represents data (a stack value) indicating a tail of the single-reading multi-stage buffer 54.

The double-reading preventive control processing unit 45, when the number-of-coincidences processing unit 44 judges that the number of coincidences reaches the predetermined number of times, reads the demodulated data from the M10-OK buffer 52. Then, the double-reading preventive control processing unit 45 notifies the reading-OK processing unit 48 of the relevant demodulated data and validates the same data on condition that the double-reading preventive timer 46 is not being actuated (which corresponds to a demodulated data validating unit). The double-reading preventive control processing unit 45 also writes the relevant demodulated data to any one of the multi-reading single-stage buffer 53 and the single-reading multi-stage buffer 54 (which corresponds to a demodulated data writing unit).

To describe it more specifically, the double-reading preventive control processing unit 45, when notified of the effect that the demodulated data is obtained by the multi-reading mode from the multi/single reading mode judging processing unit 47, stores the multi-reading single-stage buffer 53 with the demodulated data. On this occasion, when the multi-reading single-stage buffer 53 has already been stored with the demodulated data, the double-reading preventive control processing unit 45 overwrites the demodulated data.

By contrast, the double-reading preventive control processing unit 45, when notified of the effect that the demodulated data is obtained by the single-reading mode, stores the single-reading multi-stage buffer 54 with the demodulated data. On this occasion, the demodulated data have already been written to all the entries in the single-reading multi-stage buffer 54, the double-reading preventive control processing unit 45 shifts backward (downward in FIG. 9) stage by stage the demodulated data written to the entries of the respective stages of the single-reading multi-stage buffer 54 (accordingly, the demodulated data stored in the entry of the (n−1)th stage is deleted, and, however, when the demodulated data to be written is stored in one of the entries "k", this piece of demodulated data is deleted, and the demodulated data stored in the entries of the (1 through k−1)th stages are shifted backward stage by stage.). Then, the double-reading preventive control processing unit 45 stores the entry of the first stage with the demodulated data. The double-reading preventive control processing unit 45, after executing such a storage process, actuates the double-reading preventive timer 46 (which corresponds to a timer actuating unit).

This double-reading preventive timer 46 is a classified as a software timer for measuring an elapsed time after being actuated and making a time-up after a fixed time has elapsed. Note that this double-reading preventive timer 46, if actuated once again while having already been actuated, restarts measuring the elapse time from the beginning.

The double-reading preventive control processing unit 45, when the double-reading preventive timer 46 is on the actuation when reading the demodulated data from the M10-OK buffer 52, checks whether or not the demodulated data is stored in the multi-reading single-stage buffer 53 or the single-reading multi-stage buffer 54. To explains it more specifically, the double-reading preventive control processing unit 45, when notified of the effect that the demodulated data is obtained by the multi-reading mode from the multi/single reading mode judging processing unit 47, compares the demodulated data with the demodulated data stored in the multi-reading single-stage buffer 53. In contrast with this, the double-reading preventive control processing unit 45, when notified of the effect that the relevant demodulated data is obtained by the single-reading mode, compares the demodulated data with all pieces of demodulated data stored in the respective stages of the single-reading multi-stage buffer 54. In any case, when the demodulated data is stored in the comparative object buffers 53, 54, the double-reading preventive control processing unit 45 assumes that the demodulated data is obtained by double reading contrary to the intention, and therefore discards the demodulated data. Whereas when the demodulated data is not stored in the comparative object buffers 53, 54, the double-reading preventive control processing unit 45 executes the same process as the one in such a case that the double-reading preventive timer 46 is not on the actuation.

The reading-OK processing unit 48, when receiving the demodulated data from the double-reading preventive control unit 45, respectively actuates the LED control unit 55, the speaker control unit 56 and the line driver control unit 57, and validates the received demodulated data.

The LED control unit 55 lights up the LED 15 for a predetermined time.

The speaker control unit 56 generates a signal sound for a predetermined time.

The line driver control unit 57 controls the line driver 26 and thereby transmits to the unillustrated host device (the register device) the demodulated data notified from the reading-OK processing unit 43.

(Bar code Recognizing/Demodulating Process)

Figure 6:
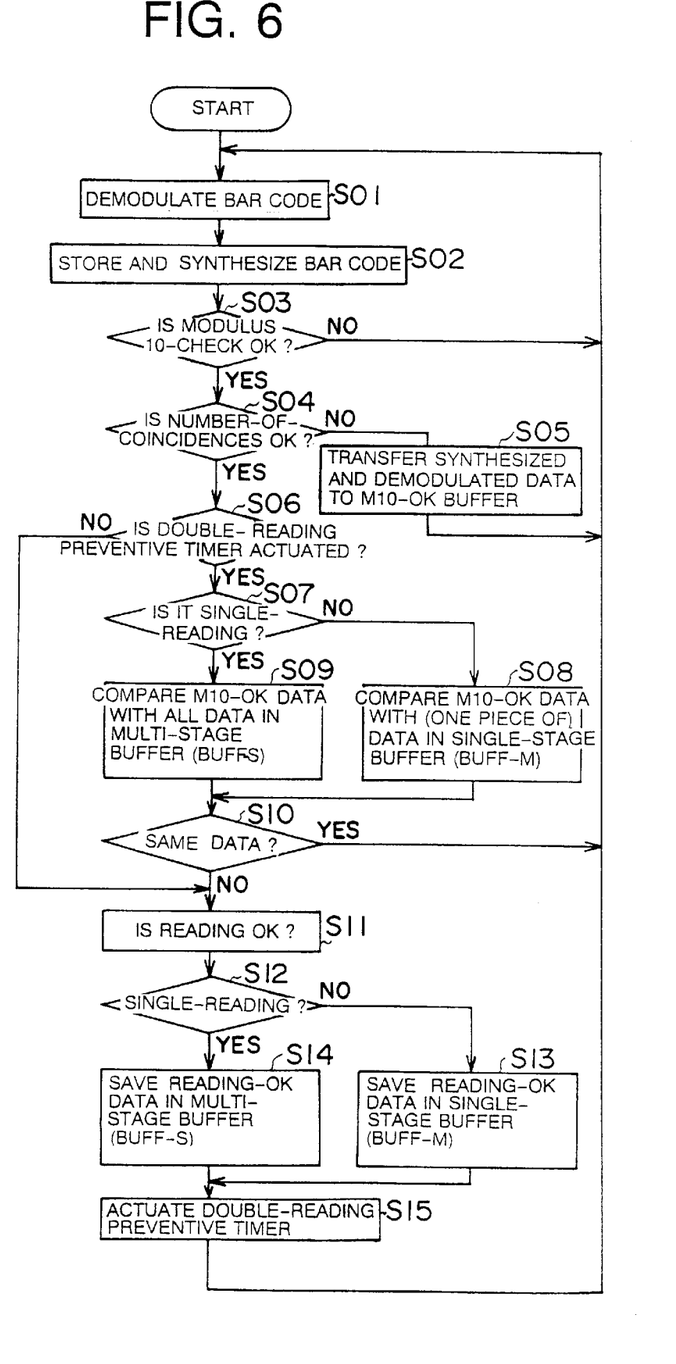
FIG. 6 is a flowchart showing contents of a bar code recognition/demodulation processing program executed by the CPU shown in FIG. 4.

Next, specific contents of the bar code recognition/demodulation processing program actually executed in the CPU 1, are explained with reference to a flowchart of FIG. 6.

This bar code recognition/demodulation processing program starts by storing the bar width data set in the memory 2 with the upon switching ON a main power supply of the bar code reader. Then, in first step S01, the bar code demodulation processing unit 42 of the CPU 20 fetches the oldest bar width data set from the memory 2, and executes the above-described bar code demodulating process with respect to this oldest bar width data set. More specifically, the bar code demodulation processing unit 42 demodulates the individual data characters contained in the bar width data set, and, every time the data character is obtained as a result of the demodulation, writes once each data character to the demodulated data temporary saving buffer 50.

In next step S02, the bar code synthesization processing unit 43 of the CPU 20 executes a bar code storing/synthesizing process. In this data storing/synthesizing process, the demodulated data corresponding to the whole bar code are synthesized by copying into the demodulated data storage buffer 51 the demodulated data written to the demodulated data temporary saving buffer 50 as a result of the bar code demodulating process in step S01. This synthesization is done by applying each piece of demodulated data in a bar code format defined in the demodulated data storage buffer 51 on the basis of one of guard bars or/and a center bar which are invariably contained in the demodulated data.

In next step S03, the number-of-coincidences processing unit 44 of the CPU 20 executes a modulus 10 check process with respect to the demodulated data stored in the demodulated data storage buffer 51, and judges whether or not a result of the modulus 10 check is good (OK). Then, when the result of the modulus 10 check is not good (NG), the number-of-coincidences processing unit 44, because of all the demodulated data being not prepared, judges that the demodulated data corresponding to the whole bar code are not yet synthesized, and returns the processing to step S001 in order to execute the demodulating process with respect to the bar width data set newly fetched from the memory 21.

Whereas when the result of the modulus 10 check is good (OK) as a consequence of repeating a loop of processes in above steps S01 through S03, the number-of-coincidences processing unit 44 of the CPU 20 compares the demodulated data stored in the demodulated data storage buffer 51 with the demodulated data stored in the M10-OK buffer 52. When coincident with each other, the number-of-coincidences processing unit 44 increments the unillustrated number-of-coincidences counter and, whereas when not coincident, resets this number-of-coincidences counter. Then, the number-of-coincidences processing unit 44 checks in step S04 whether or not the counter value of the number-of-coincidences counter reaches a predetermined value as a result of the increment or the resetting.

The number-of-coincidences processing unit 44, when the counter value of the number-of-coincidences counter does not yet reach the predetermined value, overwrites he demodulated data stored in the demodulated data storage buffer 51 to the M10-OK buffer 52 in step S05, and thereafter returns the processing to step S01.

On the other hand, when the counter value of the number-of-coincidences counter reaches the predetermined value, the double-reading preventive control processing unit 45 of the CPU 20 checks whether or not the double-reading preventive timer 46 is on the actuation. Then, when the double-reading preventive timer 46 is not yet actuated, the double-reading preventive control processing unit 45 advances the processing to step S11. By contrast, when the double-reading preventive timer is actuated, the double-reading preventive control processing unit 45 advances the processing to step S07.

In step S07, the double-reading preventive control processing unit 45 checks whether to be notified of the single-reading mode or the multi-reading mode from the multi/single reading mode judging processing unit 47.

Then, if notified of the multi-reading mode, the double-reading preventive control processing unit 45 compares in step S08 the demodulated data stored in the M10-OK buffer 52 with the single piece of demodulated data stored in the multi-reading single-stage buffer 53, and advances the processing to step S10. In contrast with this, when notified of the single-reading mode, the double-reading preventive control processing unit 45 compares in step S09 the demodulated data stored in the M10-OK buffer 52 with all the demodulated data stored in the single-reading multi-stage buffer 54, and advances the processing to step S10.

In step S10, the double-reading preventive control processing unit 45 checks whether or not the demodulated data stored in the M10-OK buffer 52 is identical with one piece of demodulated data stored in the comparative object buffers 53, 54 as a result of the comparison made in step S08 or S09. Then, the double-reading preventive control processing unit 45, when judging that the demodulated data stored in the M10-OK buffer 52 is identical with any one piece of demodulated data stored in the comparative object buffers 53, 54, acknowledges that the demodulated data is obtained by the double-reading contrary to the intention, and returns the processing to step S01. By contrast, the double-reading preventive control processing unit 45, when judging that the demodulated data stored in the M10-OK buffer 52 is not identical with one piece of demodulated data stored in the comparative object buffers 53, 54, advances the processing to step S11.

In step S11, the reading-OK processing unit 48 of the CPU 1 executes the "reading-OK" process in order to validate the demodulated data stored in the M10-OK buffer 52. Namely, the reading-OK processing unit 48 indicates the control unit 56 so as to output the voice signal from the speaker 13, indicates the LED control unit 55 to light up the LED 15, and indicates the line driver control unit 57 to transmit the demodulated data stored in the M10-OK buffer 52 to the unillustrated host device.

In next step S12, the double-reading preventive control processing unit 45 checks whether to be notified of the single-reading mode or the multi-reading mode from the multi/single reading mode judging processing unit 47. Then, when notified of the multi-reading mode, the double-reading preventive control processing unit 45 overwrites in step S13 the demodulated data stored in the M10-OK buffer 52 to the multi-reading single-stage buffer 53. In contrast with this, when notified of the single-reading mode, the double-reading preventive control processing unit 45 stores in step S14 a head entry of the single-reading multi-stage buffer 53 with the demodulated data stored in the M10-OK buffer 52 by shifting backward stage by stage the demodulated data stored in the single-reading multi-stage buffer 53. In any case, the double-reading preventive control processing unit 45 actuates (re-actuates) the double-reading preventive timer 46, and returns the processing to step S01.

(Operation of Bar Code Demodulating Device)

Figure 13:
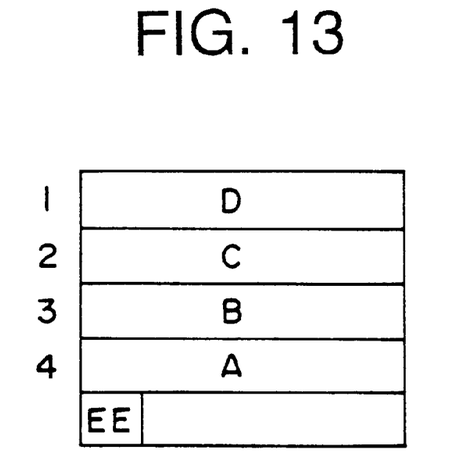
FIG. 13 is a diagram showing a state where the single-reading multi-stage buffer is stored with demodulated data.

Now, it is assumed that, as shown in FIG. 13, the single-reading multi-stage buffer 54 has n=4 stages of entries and is capable of storing four pieces of demodulated data. Then, it is also assumed that the bar codes A, B, C, D ... be printed in sequence from above on a bar code list BL as shown in FIG. 14. Further, it is presumed that the operator of the bar code reader 1 reads these bar codes A through D in sequence from above by the single-reading mode (while pushing the switch 14). As a result, the demodulated data obtained by demodulating the bar codes A through D are stored in the respective entries of the single-reading multi-stage buffer 54 in the sequence as shown in FIG. 13.

Herein, when the operator lifts the bar code demodulating device in order to read a next bar code (E), the bar codes D, C, ... might be scanned in sequence, and a bar width data set obtained by reading of the bar code D by accident, a bar width data set obtained by reading the car code C by accident, ... are sequentially stored in the memory 21.

In this case, the double-reading preventive timer 46 is actuated just when the reading the bar code D is completed (step S15). Accordingly, even if both of results of the modulus 10 check (step S03) and of the number-of-coincidences check (step S04) with respect to the demodulated data obtained by demodulating those bar width data sets become preferable, these pieces of demodulated data have already been stored in the single-reading multi-stage buffer 54 (steps S09, S10) and are therefore discarded without executing the reading-OK process (step S11).

Thereafter, it is assumed that the bar width data set corresponding to the bar code E is stored in the memory 21 as a result of reading the bar code E by the operator having lowered the bar code reader 1 just above the bar code list BL.

In this case, the double-reading preventive timer 46 does not make a time-up. However, the single-reading multi-stage buffer 54 is not yet stored with the demodulated data corresponding to the bar code E that is obtained by demodulating the bar width data set (steps S09, S10), and hence the reading-OK process is executed (step S11). Thereafter, there is deleted the demodulated data corresponding to the bar code A stored in the least significant entry of the single-reading multi-stage buffer 54, and the demodulated data stored in other entries are shifted backward stage by stage, with the result that the demodulated data corresponding to the bar code E is stored in the head entry.

Thus, according to the bar code reader in this embodiment, even in such a case that the bar codes printed on the bar code list BL are consecutively read, it is feasible to surely eliminate the demodulated data based on the bar width data set read by the laser beam L scanning the bar code by accident, and hence the double-reading of the bar code can be properly prevented.

According to the constructed bar code reader of the present invention, even when reading the bar code on the sheet on which the plurality of bar codes are printed, it is possible to appropriately the bar code from being read double.

It is apparent that, in this invention, a wide range of different working modes can be formed based on the invention without deviating from the spirit and scope of the invention. This invention is not restricted by its specific working modes except being limited by the appended claims.

We claim:

1. A bar code reader comprising:

a detecting unit detecting a bar code pattern based on reflected beams from a bar code;

a demodulating unit executing a demodulating process based on the bar code pattern detected by said detecting unit to obtain data coded into the bar code as demodulated data;

a storage written with demodulated data and storing a predetermined plurality of recently written demodulated data;

a timer measuring an elapsed time after actuating thereof and stopping when the elapse time reaches a predetermined time;

a demodulated data validating unit for validating the demodulated data obtained by said demodulating unit on condition that the demodulated data is not identical with any piece of demodulated data stored in said storage if said timer is measuring the elapse time at a point when the demodulated data is obtained by said demodulating unit, and immediately validating the demodulated data obtained by said demodulating unit if said timer is not measuring the time at a point when the demodulated data is obtained by said demodulating unit;

a demodulated data writing unit, when said demodulated data validating unit validates the demodulated data, for writing the demodulated data into said storage; and a timer actuating unit for actuating said timer when said demodulated data validating unit validates the demodulated data.

2. A bar coder reader according to claim 1, wherein said storage unit stores only one piece of data with respect to identical demodulated data.

3. A bar code reader according to claim 1, wherein a number of said timer is only one, and wherein said timer re-measures the elapsed time from a start every time actuated by said timer actuating unit.

4. A bar code reader according to claim 1, further comprising:

a first scan mechanism for irradiating the bar code with a light beam to scan the bar code in only one direction;

a second scan mechanism for irradiating the bar code with light beams to scan the bar code in a plurality of directions; and a judging unit for judging whether the demodulated data demodulated by said demodulating unit is first demodulated data based on a reflected light beam of the light beam irradiated by said first scan mechanism or second demodulated data based on reflected light beams of the light beams irradiated by said second scan mechanism, wherein said storage unit stores only the first demodulated data, wherein said demodulated data validating unit validates the first demodulated data obtained by said demodulating unit on condition that the first demodulated data is not identical with any piece of demodulated data stored in said storage if said timer is measuring the elapsed time at a point when the first demodulated data is obtained by said demodulating unit, and immediately validates the first demodulated data obtained by said demodulating unit if said timer is not measuring the elapsed time at a point when the first demodulated data is obtained by said demodulating mechanism, and wherein said demodulated data writing unit writes the first demodulated data into said storage unit when said demodulated data validating unit validates the first demodulated data.

5. A bar code reader according to claim 4, further comprising a second storage storing only one piece of the second demodulated data, wherein said demodulated data validating unit validates the second demodulated data obtained by said demodulating unit on condition that the second demodulated data is not identical with the demodulated data stored in said second storage if said timer is measuring the elapsed time at a point when the second demodulated data is obtained by said demodulating unit, and immediately validates the second demodulated data obtained by said demodulating unit if said timer is not measuring the elapsed time at a point when the second demodulated data is obtained by said demodulating mechanism, and wherein said demodulated data writing unit writes the second demodulated data into said second storage when said demodulated data validating unit validates the second demodulated data.

6. A bar code reader comprising:

a bright/dark data detecting unit detecting bright/dark data corresponding to a bright/dark pattern of a current bar code based on reflected beams from the current bar code;

a demodulating unit executing a demodulating process based on the bright/dark data detected by said bright/dark detecting unit to obtain data coded into the current bar code as current demodulated data;

a storage storing a predetermined plurality of previously demodulated data corresponding to a predetermined plurality of bar codes;

a demodulated data validating unit for validating the current demodulated data obtained by said demodulating unit on condition that the current demodulated data obtained by said demodulating unit is not identical with any one of said previously demodulating data stored in said storage; and a demodulated data writing unit, when said demodulated data validating unit validates the current demodulated data, for writing the current demodulated data to said storage.

7. A bar code reader, comprising:

a scan mechanism for irradiating the bar code with light beams to scan the bar code in a plurality of directions;

a light receiving unit receiving reflected light beams of the light beams irradiated by the scan mechanism;

a demodulating unit obtaining data coded into the bar code as demodulated data based on the reflected light beams received by the light receiving unit;

a judging unit for judging whether the demodulated data is based on the reflected light beams of the light beams irradiated by said scan mechanism or not;

a storage storing the demodulated data; and a data writing part writing the demodulated data in the storage when the judging unit judges that the demodulated data demodulated by said demodulating unit is based on the reflected light beams of the light beams irradiated by said scan mechanism.

8. A bar code reader, comprising:

a first scan mechanism for irradiating a bar code with a light beam to scan the bar code in only one direction;

a second scan mechanism for irradiating the bar code with light beams to scan the bar code in a plurality of directions;

a light receiving unit receiving a reflected light beam of the light beam irradiated by the first scan mechanism and reflected light beams of the light beams irradiated by the second scan mechanism;

a demodulating unit obtaining data coded into the bar code as demodulated data based on the reflected light received by the light receiving unit;

a judging unit for judging whether the demodulated data demodulated by said demodulating unit is first demodulated data based on the reflected light beam of the light beam irradiated by said first scan mechanism or second demodulated data based on the reflected light beams of the light beams irradiated by said second scan mechanism;

a first storage storing the first demodulated data;

a second storage storing the second demodulated data; and a data writing part writing the first demodulated data in the first storage when the judging unit judges that the demodulated data demodulated by said demodulating unit is first demodulated data based on the reflected light beam of the light beam irradiated by said first scan mechanism, and writing the second demodulated data in the second storage when the judging unit judges that the demodulated data demodulated by said demodulating unit is second demodulated data based on the reflected light beams of the light beams irradiated by said second scan mechanism.

9. A bar code reading comprising:

a detecting unit detecting a bar code pattern based on reflected beams from a bar code;

a demodulating unit executing a demodulating process based on the detected bar code pattern to generate current demodulated data;

a first storage unit storing a single previously demodulated data of a single bar code;

a second storage unit storing a plurality of previously demodulated data corresponding to a plurality of bar codes;

a demodulated data validating unit for validating the current demodulated data obtained by the demodulating unit on condition that the current demodulated data obtained by the demodulating unit is not identical with said single previously demodulated data stored in the first storage unit or not identical with any one of said plurality of previously demodulated data stored in the second storage unit; and a data writing unit writing the current demodulated data validated by said demodulated data validating unit into the first storage unit when a single reading mode is selected, or into the second storage unit when a multi-reading mode is selected.

* * * * *